Aug. 30, 1966 W. R. BONWIT ETAL 3,269,280
CARTON BLANKING DIE
Original Filed Feb. 21, 1962 3 Sheets-Sheet 2
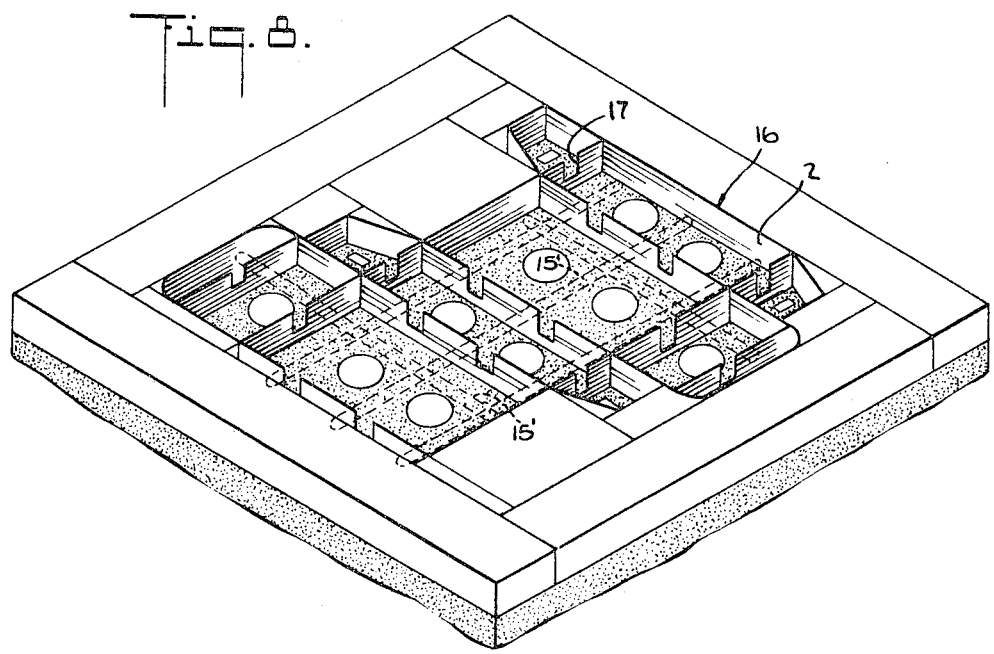
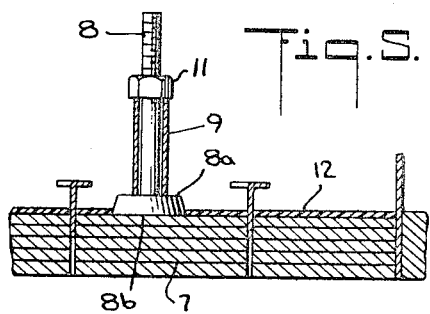
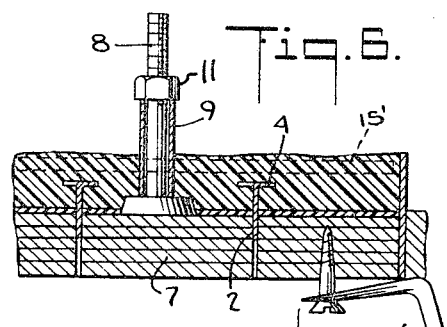
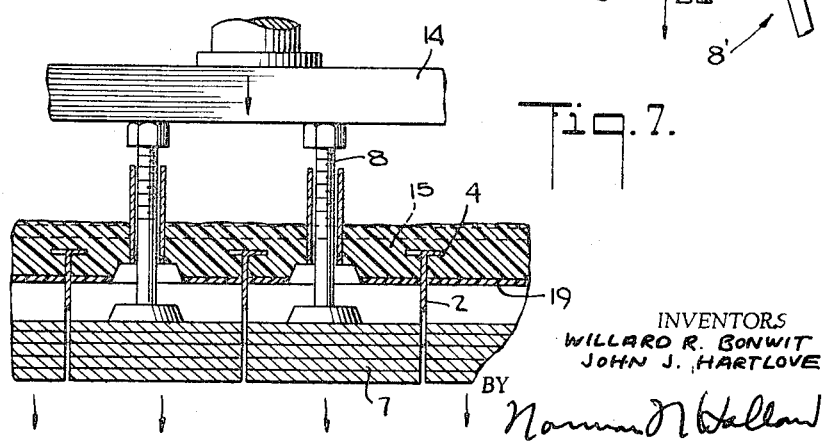
INVENTORS
WILLARD R. BONWIT
JOHN J. HARTLOVE
BY
ATTORNEY

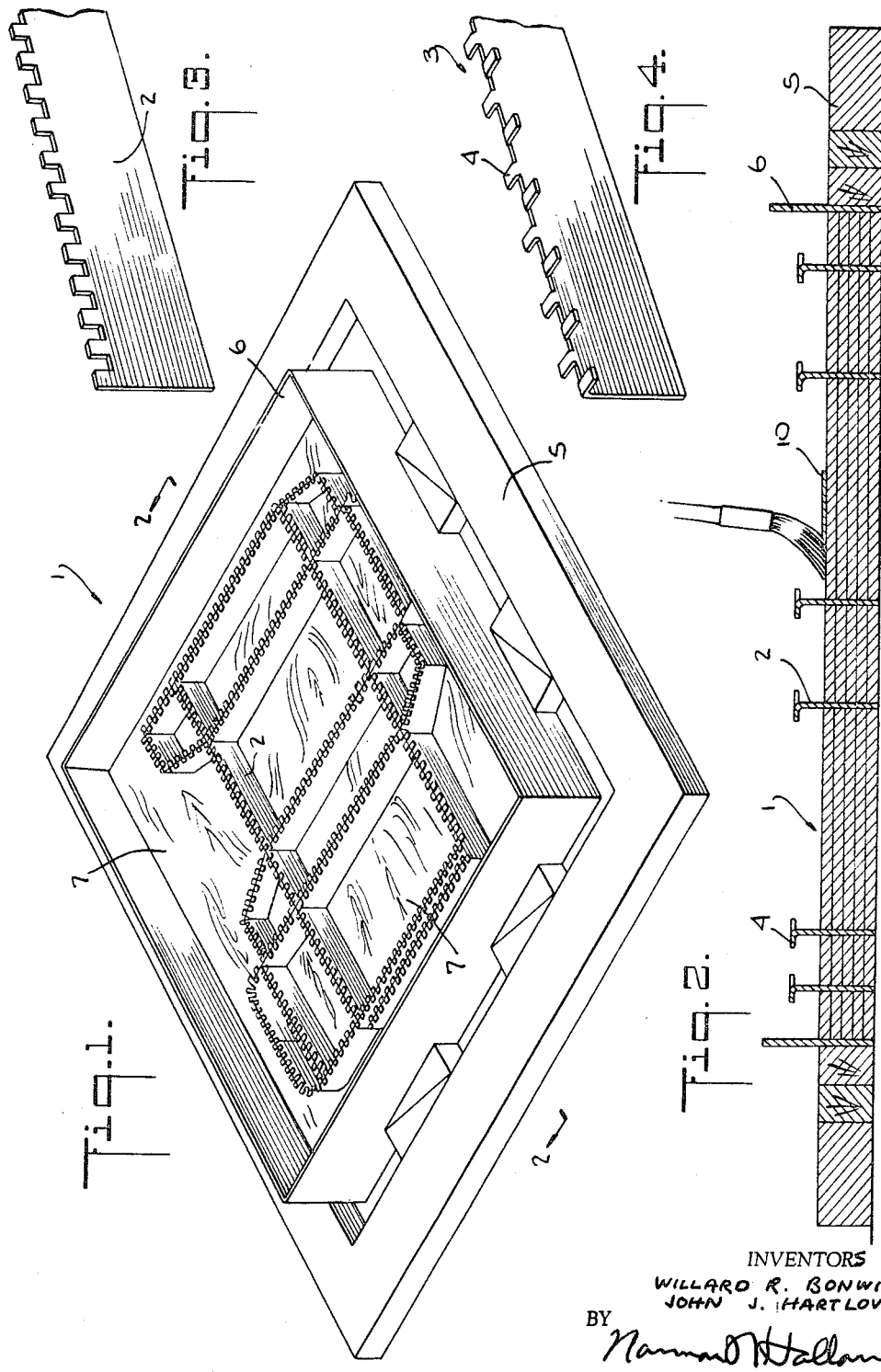

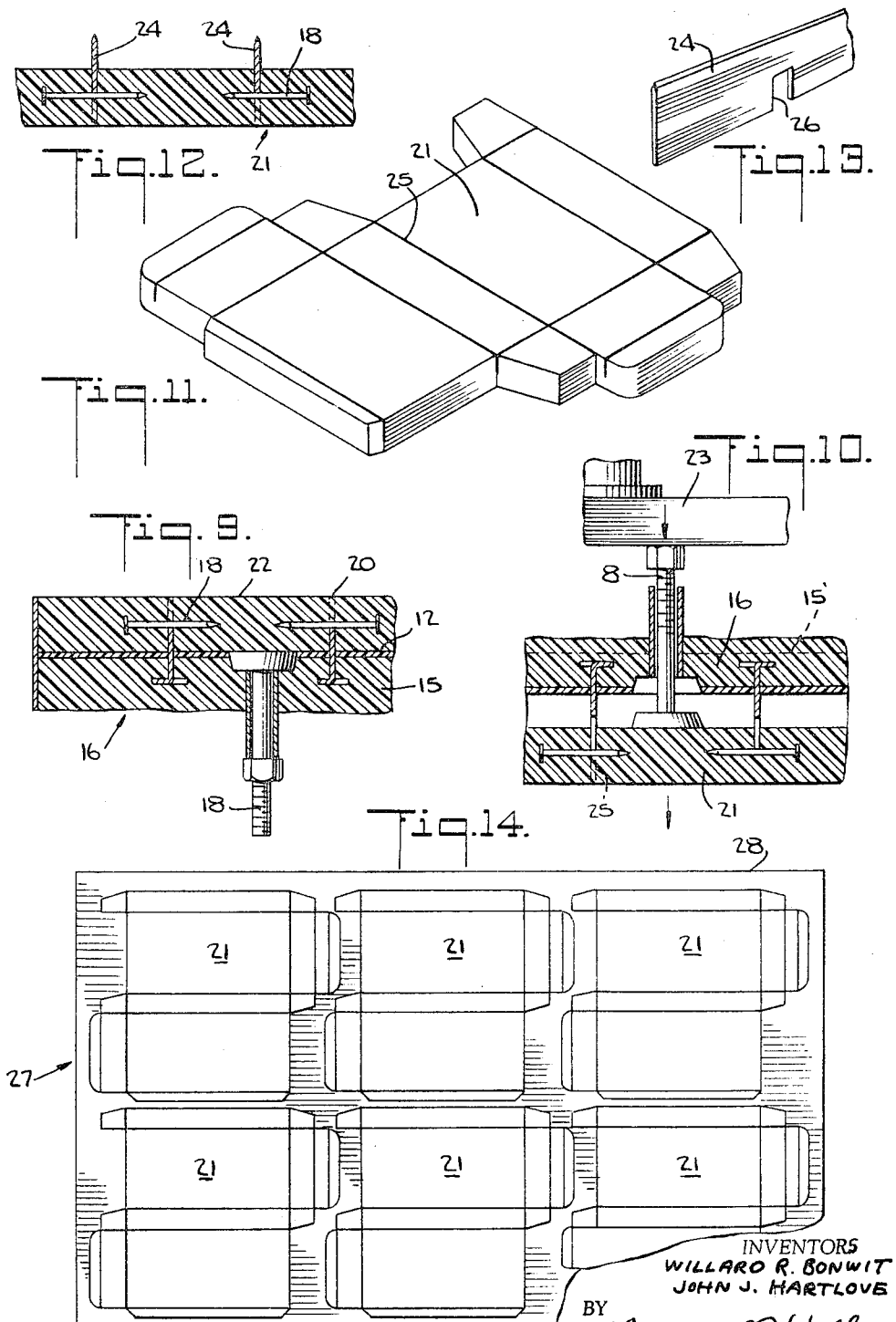

United States Patent Office 3,269,280
Patented August 30, 1966

3,269,280
CARTON BLANKING DIE
Willard R. Bonwit, Rydal, Pa., and John J. Hartlove, Baltimore, Md., assignors to The Lord Baltimore Press Incorporated, Baltimore, Md., a corporation of Maryland
Original application Feb. 21, 1962, Ser. No. 174,807, now Patent No. 3,196,716, dated July 27, 1965. Divided and this application Apr. 6, 1965, Ser. No. 460,883
9 Claims. (Cl. 93—58)

This is a division of application Serial No. 174,807, filed February 21, 1962, now U.S. Patent No. 3,196,716, issued July 27, 1965.

The present invention relates to a die used to form carton blanks from cardboard sheets and more specifically to a method of forming such a die by a molding process and to the die thus formed.

Carton blanking dies are presently made by supporting appropriately shaped metal cutting knives and scoring rules between carefully shaped wooden block members with the knives and rules in the blocks being locked together in a suitable frame so that a rigid structure results which may be placed in the carton blanking press. The forming of these dies is a painstaking operation which is both time consuming and difficult, so that the dies are expensive and are difficult to duplicate with the necessary accuracy in the forming of gang dies.

Several attempts have been made to simplify die manufacturing by replacing all or some of the wooden blocks with molded supports for positioning the knives and rules. While a substitution of molded supports for the wooden blocks appears at first to be a convenient and simple solution for more rapid and accurate die construction, a number of serious problems accompanying such a molding process have until now made the molded dies impractical due to the complexity of the substitute process or due to failure of the molded supports to retain the necessary accuracy.

Accordingly, an object of the present invention is to provide an improved method of manufacturing carton blanking dies using a molding process which is both easily carried out and which provides molded supports which are firm and which have negligible shrinkage.

Another object of the present invention is to provide improved carton blanking dies.

Another object of the present invention is to provide a relatively simple means of duplicating a model carton blanking die to form gang dies.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a duplicate model die prepared for use in the process of the invention;

FIG. 2 is a sectional view taken along line 2—2 of FIG. 1;

FIGS. 3 and 4 are enlarged fragmentary views of a portion of a knife or rule as used in the model die of FIG. 1 showing the formation of the locking teeth;

FIG. 5 is a fragmentary sectional view of the model die showing the application of a surface coating and the positioning of the specially designed machine bolts;

FIG. 6 is a sectional view corresponding to FIG. 5 illustrating the molding of the master die on top of the model die;

FIG. 7 is a sectional view corresponding to FIGS. 5 and 6 illustrating the removal of the wooden blocks from the master die with the machine bolts;

FIG. 8 is a perspective view of the master die preparatory to the casting of the unit dies;

FIG. 9 is a fragmentary sectional view illustrating the molding of the unit dies using the molded master die;

FIG. 10 is a sectional view corresponding to FIG. 9 showing the removal of the molded unit die from the master die;

FIG. 11 is a perspective view of the molded unit die preparatory to the insertion of the knives and rules;

FIG. 12 is a fragmentary sectional view of the completed unit die;

FIG. 13 is a perspective view of a knife showing the cut-outs to accommodate the metal tie-rods in the molded unit die; and FIG. 14 is a top plan view of a gang die showing several molded unit dies mounted in their carton blanking position.

The first step in the regular process for manufacturing a new carton comprises the manufacture of a model or test die for the purpose of making several sample cartons and testing them on the customer's packaging machines. This die is made in the regular way using wooden blocks and the cartons are test run, so that the exact positioning of the cutting knives and the creasing rules in the blanking die can be determined. Our present improved process utilizes this first step to form the conventional model or test die 1 to insure that the cartons to be made are suitable for the customer's packaging machinery.

Thereafter, the necessary number of unit dies needed to prepare the gang die for blanking out the cartons in a production run are formed as follows by our new molding process. The first step in our new process consists of the substitution of special rules 2 in place of the original rules and knives of the model die.

The rules 2 are higher than the regular knives and preferably have a tooth-like edge as illustrated at 3 in FIG. 4. This tooth-like edge 3 has a series of teeth 4 along the top edge of the rules 2 as shown in FIG. 3 which are bent in a horizontal position as illustrated in FIGS. 2 and 4. The purpose of the teeth 4 is to lock these rules 2 into a molded master die which is formed on the model die 1.

The model die 1 with the rules 2 is locked in a chase 5 with a metal frame 6 enclosing the perimeter of the model die 1 to facilitate the molding operation. The surfaces of the wooden blocks 7 of the model die 1 are now painted with a suitable parting agent which is brushed over the surface of the blocks 7 and is allowed to thoroughly dry.

A suitable parting agent is a Teflon emulsion. One such agent is known in the trade as PIO–CON–131 and is made by the Daniel Spector Company, of Baltimore, Maryland.

A specially machined bolt 8 having surfaces 8a and 8b machine finished is now placed on each of the larger wooden blocks 7 forming the model die 1 to assist in the separation of the wooden blocks 7 from the rules 2 after the master die is molded above the model die 1. These specially machined bolts 8 preferably have a sleeve 9 slidably fitted on them to isolate the bolt 8 from the plastic of the master die and a nut 11 temporarily holds the sleeve 9 in place. Smaller wooden blocks are removed by wood screws as illustrated at 8' in FIG. 6.

The surface of the model die 1 is now prepared for the final casting of the master die by the painting of a surface coating 12 on the wooden blocks 7 over the parting agent 10. This surface coating 12 is used to provide a hard, smooth finish for the master die. A preferred surface coating material is epoxy resin formulated with one of the known epoxy catalysts. A suitable epoxy is known in the trade as TC-2402. The coating is formulated using 100 parts of TC-2402 with 12 parts of TH-12 catalyst by weight. These epoxies and catalysts are made by the Hysol Corporation, of Olean, New York.

The surface coating is allowed to dry thoroughly and the model die 1 is now ready for the casting of the master die which is done by filling the remaining space above the surface coating 12 and within the frame 6.

The preferred casting material is epoxy casting material which forms a hard smooth master die with a low shrinkage factor. One suitable epoxy is known in the trade as TC-3082 and the preferred formulation uses 100 parts of epoxy to 19 parts the epoxy catalyst or hardener TH-3 by weight. These materials are made by the Hysol Corporation, of Olean, New York. This formulation is then mixed with sand in the ratio of 119 parts to 340 parts of sand by weight. After the casting material is flowed into the die it is allowed to cure or harden for one to two hours. Preferably, in order to strengthen the master die, metal rods having a diameter of about 1/8" are run the full width and length of the master die in the epoxy and above the rules and knives as illustrated at 15'.

The wooden blocks 7 of the original model die 1 are now removed as illustrated in FIG. 7 by forcing the wooden blocks from between the rules 2 by pressing downwardly on the specially machined bolts 8 with a suitable press 14 or other pressure means. It will be seen that this results in the formation of a mirror image master die 16 comprising the epoxy base 15 having the rules 2 firmly embedded therein in an exact mirror image of the knife and rule arrangement for the final unit dies. This molded master die 16 may now be used to form any number of molded unit dies to construct the final gang die such as illustrated in FIG. 14.

The process of forming the unit dies from this plastic master die 16 is as follows.

As illustrated in FIG. 8, the removal of the blocks 7 exposes the underside of the rules 2. Preferably, a series of slots 17 have been provided in this lower portion of these rules 2 to accommodate linking members such as the nails or rod-like members 18 (FIG. 9) which may be placed across the slots 17 before, during or after the epoxy casting material is flowed into the master die 16 to form the unit die. The surface 19 of the master die 16 is now painted with the above described parting agent. After the parting agent has dried, the above-described epoxy casting material is used to fill the master die to the level of the edges 20 of the rules 2 as illustrated in FIG. 9. The above-described nails or tie-rods 18 help to form unitary die 21 as illustrated in FIG. 11. After the master die 16 is filled with the epoxy casting material and the nails are placed in position as illlustrated in FIG. 9, a flat plate is preferably clamped over the edges 20 of the rules 2 of the master die and the master die 16 is inverted so that the unit die 21 has a flat bottom surface 22. The unit die 21 is then allowed to set until it cures or hardens in a period of from one to two hours and thereafter the back plate is removed. The unit die 21 is forced out from the master die using the same specially machined bolts 8 as previously used in forcing out the wooden blocks 7. This may be conveniently done by simultaneously applying force to all of the elevator bolts 8 by a hydraulic press 23 as illustrated in FIG. 10 and is facilitated by vibrating the master die 16. The unit die 21 thus formed and illustrated in FIG. 11 is now ready for the insertion of the final cutting rules and scoring knives 24 which are pressed into the slots 25 formed during the above described molding of the unit dies 21 and which are held in place by friction. These rules and knives 24 have slots 26 appropriately spaced to accommodate the nails 18 used to strengthen the unit die 21 as illustrated in FIG. 12 which is a cross-section of the completed unit die with the knives 24 in place. The unit dies 21 are now assembled in the regular way in a gang die 27 being mounted into place in a suitable chase 28 and the unit dies 21 may be spaced with regard to the chase 28 and with each other by suitably spaced blocks if necessary.

Since the spacing and shaping of the knives and rules 24 are determined by the position of the slots 25 in the unit dies 21 and the outer shaped edges of the unit dies 21 and since the molding process insures that these portions of the unit dies are identical, it is clear that the assembled gang die 27 as illustrated in FIG. 14 will cut six absolutely identical carton blanks.

Additional identical gang dies may be made and the individual unit dies may be replaced as necessary in the gang die by using the master die and the above-described molding process.

Since it is not uncommon for as many as 75 individual carton blanks to be cut from a single sheet and since the carton blanks thus cut are handled by the same packaging machinery, the importance of having the carton blanks identical and cut from identical unit dies is readily seen. The unit dies manufactured by the above-described process easily meet these exacting requirements and also are rugged, so that their initial accuracy is retained in the carton blanking presses.

The above-described process of molding unit dies using epoxy casting materials also results in extremely low shrinkage of the master and the unit dies during curing. This eliminates one serious difficulty encountered in previous attempts to mold these dies. Not only does the above process result in low shrinkage which permits this factor to be ignored in most cases, but the small amount of shrinkage which does occur in the casting steps is predictable for the size of die being made, so that it may be anticipated and corrected for in cases where the shrinkage must be kept at approximately zero.

In addition to the increased accuracy of the unit dies produced by this molding method, the dies also may be produced more rapidly and by less experienced personnel than the conventional wooden block dies since the molding techniques are readily mastered while the duplication of the unit dies with wooden blocks especially shaped for each individual unit die is an exacting art which is mastered only with considerable experience.

It will be seen that the above described molding method provides a relatively simple process of making carton blanking dies with great accuracy, so that any number of identical individual unit dies may be quickly made from an approved sample die. The above-described method takes full advantage of the speed and simplicity of molding techniques and overcomes the drawbacks of prior processes of duplicating dies such as excess shrinkage during manufacture and die fracture or warping after the completion and mounting of the unit dies.

As various changes may be made in the arrangement of the members of the combination described without departing from the spirit and scope of the invention and without sacrificing any of its advantages, it is to be understood that all matter herein is to be interpreted as illustrative and not in a limiting sense.

Having thus described our invention, we claim:

1. A molded master die for forming molded unit dies comprising a unitary molded base, a set of rules mounted in a predetermined pattern in said base corresponding to the desired carton, and anchoring members on said rules firmly locking said rules into the molded base.

2. A molded master die for forming molded unit dies comprising a unitary molded epoxy resin base, a set of rules mounted in a predetermined pattern in said base corresponding to a mirror image of the desired carton, and anchoring members on said rules firmly locking said rules into the molded base.

3. A molded master die for forming molded unit dies comprising a unitary molded epoxy resin base, a set rules mounted in a predetermined pattern in said base corresponding to a mirror image of the desired carton, and said rules having a plurality of integral laterally extending projections encased in said base.

4. The master die as claimed in claim 3 which further comprises a plurality of cut-out slots in the rules of said set of rules extending to an exposed edge thereof.

5. The master die as claimed in claim 3 which further comprises a reinforcing rod embedded in said base.

6. A unit die comprising a plurality of molded blocks shaped to contain a set of rules in a predetermined pattern, said blocks being spaced by grooves having a width about the same as the width of said rules of said set, and a plurality of reinforcing members each crossing only one of said grooves.

7. The die as claimed in claim 6 in which said blocks comprise epoxy resin.

8. A model die for forming molded unit dies comprising a base supporting a set of rules in a predetermined pattern corresponding to the desired carton, and said rules having exposed anchoring projections thereon.

9. The model die as claimed in claim 8 in which said projections comprise teeth bent at an angle to the plane of the rules.

References Cited by the Examiner
UNITED STATES PATENTS

| | | | |
|---|---|---|---|
| 2,863,337 | 12/1958 | Ackley | 93—58.2 XR |
| 2,993,421 | 7/1961 | Phillips et al. | 93—58 |
| 3,063,349 | 11/1962 | Phillips et al. | 93—58 |
| 3,108,327 | 10/1963 | Phillips et al. | |

BERNARD STICKNEY, *Primary Examiner.*